United States Patent
Bohlin (10) Patent No.: US 11,323,298 B2
(45) Date of Patent: May 3, 2022

(54) DBI PROTECTION FOR DATA LINK

(71) Applicant: Telefonaktiebolaget LM Ericsson (publ), Stockholm (SE)

(72) Inventor: Lars Gustav Bohlin, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 494 days.

(21) Appl. No.: 16/342,809

(22) PCT Filed: Oct. 28, 2016

(86) PCT No.: PCT/SE2016/051054
§ 371 (c)(1),
(2) Date: Apr. 17, 2019

(87) PCT Pub. No.: WO2018/080360
PCT Pub. Date: May 3, 2018

(65) Prior Publication Data
US 2021/0288848 A1    Sep. 16, 2021

(51) Int. Cl.
*H04L 25/49* (2006.01)
*G06F 13/42* (2006.01)
*H04L 1/00* (2006.01)

(52) U.S. Cl.
CPC ...... *H04L 25/4915* (2013.01); *G06F 13/4204* (2013.01); *H04L 1/0041* (2013.01)

(58) Field of Classification Search
None
See application file for complete search history.

(56) References Cited

U.S. PATENT DOCUMENTS

| 5,748,677 | A | * | 5/1998 | Kumar | H04J 1/12 375/229 |
| 6,061,823 | A | * | 5/2000 | Nara | H03M 13/09 714/758 |
| 6,167,552 | A | * | 12/2000 | Gagnon | H03M 13/23 714/760 |
| 2011/0084737 | A1 | * | 4/2011 | Oh | H04L 25/49 327/108 |

(Continued)

OTHER PUBLICATIONS

International Search Report dated Jul. 10, 2017 for International Application No. PCT/SE2016/051054 filed on Oct. 28, 2016, consisting of 10-pages.

(Continued)

*Primary Examiner* — Santiago Garcia
(74) *Attorney, Agent, or Firm* — Christopher & Weisberg, P.A.

(57) ABSTRACT

There is disclosed integrated circuitry having a bit receiving arrangement adapted for receiving, in parallel, a plurality of data bits, the bit receiving arrangement further being adapted for receiving a data bit inversion bit associated to the plurality of data bits, the data bit inversion bit being for indicating whether the bits of the plurality of data bits are inverted. The integrated circuitry also has a bit inversion arrangement adapted for inverting the bits of the plurality of data bits based on a comparison between the received data bit inversion bit and an inversion estimate bit, the inversion estimate bit being determined based on the plurality of data bits. The disclosure also pertains to related methods and devices.

4 Claims, 5 Drawing Sheets

DBI Correction Algorithm (56) References Cited

U.S. PATENT DOCUMENTS

| | | | |
|---|---|---|---|
| 2014/0281075 A1* | 9/2014 | Hollis | H04L 7/04 |
| | | | 710/106 |
| 2015/0188666 A1* | 7/2015 | Mahdavifar | H04L 1/0041 |
| | | | 375/295 |
| 2015/0212156 A1* | 7/2015 | Bourstein | H04L 1/0042 |
| | | | 714/744 |
| 2016/0019179 A1* | 1/2016 | Loke | G06F 13/4072 |
| | | | 341/58 |
| 2016/0277145 A1* | 9/2016 | Grant | H03M 13/2957 |
| 2019/0280813 A1* | 9/2019 | Kozhikkottu | H03M 5/14 |

OTHER PUBLICATIONS

EPO Communication dated Mar. 18, 2021 for International Application No. 16797668.7, consisting of 6-pages.

* cited by examiner

DBI PROTECTION FOR DATA LINK

CROSS-REFERENCE TO RELATED APPLICATIONS

This application is a Submission Under 35 U.S.C. § 371 for U.S. National Stage Patent Application of International Application Number: PCT/SE2016/051054, filed Oct. 28, 2016 entitled "DBI PROTECTION FOR DATA LINK," the entirety of which is incorporated herein by reference.

TECHNICAL FIELD

The present disclosure pertains to data transfer in electronic or integrated circuitry, in particular in the context of data bit inversion bit usage.

BACKGROUND

For parallel transmission of data in electronic circuitry (e.g., via a bus and/or multiple pins and/or lines), quality of transmission (e.g., represented by a small error rate) and power efficiency are important considerations. In this context, it has been found out to be advantageous to use data bit inversion between two subsequent data transmission events, in which the mapping between electrical state (e.g., voltage) and bit value (e.g., 0 or 1) is inversed (or reversed) between the two transmission events.

SUMMARY

It is an object of the present disclosure to provide approaches facilitating improve data transfer in the context of data bit inversion.

Accordingly, there is disclosed integrated circuitry. The integrated circuitry comprises a bit receiving arrangement adapted for receiving, in parallel, a plurality of data bits, the bit receiving arrangement further being adapted for receiving a data bit inversion bit associated to the plurality of data bits, the data bit inversion bit being for indicating whether the bits of the plurality of data bits are inverted. Moreover, the integrated circuitry comprises a bit inversion arrangement adapted for inverting the bits of the plurality of data bits based on a comparison between the received data bit inversion bit and an inversion estimate bit, the inversion estimate bit being determined based on the plurality of data bits. This allows to provide protection for the data bit inversion bit, respectively to reconstruct the data bit inversion bit. Accordingly, errors in transmission of the data bit inversion bit may be detected and/or recovered.

There is also disclosed a method for operating integrated circuitry, which may comprise or be any of the integrated circuitry and/or be implemented in any of the devices described herein. The method comprises inverting the bits of a plurality of data bits received in parallel based on a comparison between a data bit inversion bit associated to the plurality of data bits and an inversion estimate bit, the inversion estimate bit being determined based on the plurality of data bits. The method may comprise and/or be considered a method or algorithm for data bit inversion bit correction.

The plurality of data bits received in parallel may be associated to a (common and/or single) transmission (and/or reception) event, and/or to a common and/or single transmission (and/or reception) of data bits. Reception (and/or transmission) of data bits in parallel may refer to bits of the (plurality of) data bits being received and/or transmitted simultaneously, and/or on a plurality of different lines and/or pins and/or data transport units.

Receiving the plurality of data bits may comprise receiving a first plurality of data bits and a second plurality of data bits (or more than two pluralities of data bits). Receiving the data bit inversion bit may comprise receiving (at least) a first data bit inversion bit, which may be associated to the first plurality of data bits, and (at least) a second data bit inversion bit, which may be associated to the second plurality of data bits. Generally, receiving a plurality of data bits may comprise receiving several pluralities of data bits, to at least one of which, or to several of which, or to each of which, there is associated at least one data bit inversion bit. Inverting may be performed, for each of the pluralities, based on the respective associated data bit inversion bit/s.

A data bit inversion bit may be received (and/or transmitted) in parallel to the associated plurality of data bits. A data bit inversion bit associated to a plurality of data bits may be for indicating and/or indicate whether each of the associated data bits is to be inverted (reversed) or not, e.g. based on the electrical state (e.g., voltage level and/or amplitude) of the data bit inversion bit. The data bit inversion bit may generally be referred to as data inversion bit, such that these terms may be used interchangeably.

For parallel transmission or reception of bits, in particular data bits, each bit may be transported and/or received and/or transmitted on an associated (and/or individually associated) data transport unit. A number of bits may be associated to a bit receiving arrangement and/or a bit transmitting arrangement. This number may correspond to the sum of the number of bits of the plurality of data bits received and/or transmitted in parallel, and the number of associated data bit inversion bits (which may be considered to be one in most cases). It may be considered that this number of bits corresponds (e.g., is equal to) the number of pins and/or lines and/or data transport units used for transmission and/or reception of the bits (which may, in particular for the data bits, be in parallel). A data transport unit may be associated to and/or utilised for the data bit inversion bit.

The bit receiving arrangement (and/or bit transmitting arrangement) may comprise one or more data transport units, which may be associated and/or adapted for parallel reception and/or transport of the number of bits associated to the respective arrangement, and/or the number of data transport units may correspond to the number of bits associated to the respective arrangement, and/or correspond to the number of bits received and/or transmitted in parallel. The bit receiving arrangement may comprise, and/or be implemented as part of, an interface, e.g. of a bus and/or a DDR interface. It may be considered that the bit receiving arrangement (or data bus) is part of, and/or connected or connectable to, a data link, which may utilise a plurality of data transport units and/or associated wires and/or cables and/or pins for data transport.

The inversion estimate bit may be determined based on a comparison of the plurality of data bits with a plurality of data bits received previously, which may be stored by the integrated circuitry, e.g. in the bit inverting arrangement and/or bit receiving arrangement and/or a corresponding data bit storage arrangement. The integrated circuitry may comprise a comparison arrangement adapted for performing such comparison and/or the method for operating may comprise a corresponding comparing. Data bits received previously may be a plurality of data bits received, e.g. by the bit receiving arrangement, in parallel at an earlier point in time (e.g., compared to reception of the plurality of bits to which the data bit inversion bit is associated). Such previously received data bits (or plurality of data bits) may be from a reception event directly before and/or preceding the reception of the plurality of data bits. A reception event or transmitting event may generally indicate the reception or transmission, in parallel, of a plurality of data bits, which may comprise the reception or transmission of the associated data bit inversion bit/s (e.g., in parallel to the plurality of bits).

It may generally be considered that the inversion estimate bit may be determined based on a determination of the number of bit transitions necessary to arrive at the plurality of data bits from a previously received plurality of data bits. Alternatively, the inversion bit estimate bit may be determined based on the number of bits of the plurality of data bits in a specific electric state (e.g. voltage level and/or amplitude, e.g. null level).

In some variants, it may be considered that, if a midpoint hit is indicated, the bits of the plurality of bits are inverted, and/or the bit inversion arrangement is adapted to invert the bits of the plurality of data bits in this case. A midpoint hit may indicate that half of the bits of the plurality of data bits required bit transitions from a previously received plurality of data bits, Alternatively, the midpoint hit may indicate that half of the bits of the plurality of data bits have a specific electric state (e.g., as explained herein at different locations). A midpoint hit may be indicated based on the determination of the inversion estimate bit and/or based on a sum of bit transitions and/or bits of a specific state, which may be calculated for determining the inversion estimate bit.

Generally, the inversion estimate bit may be determined by the integrated circuitry and/or the receiving side (receiving device), in particular by the bit inversion arrangement or bit receiving arrangement, or a subcircuitry of either one.

It may be considered that the integrated circuitry comprises an error handling arrangement. The error handling arrangement may be adapted for error handling. It may be considered that the method for operating integrated circuitry may comprise error handling. Error handling may comprise determining and/or correcting an (or more than one) error in the received plurality of data bits and/or the data bit inversion bit. Error handling may be based on ECC (Error Correcting Code) techniques. Associated bits may be included in the plurality of bits. ECC may cover the data bits, or a subset of the data bits. In some cases, it may include the data bit inversion bit. Error handling may be based on the inversion estimate bit, in particular on a comparison between the inversion estimate bit and the data bit inversion bit (as received). An assumption whether the data bit inversion bit is correct or not (which may be based on the comparison) may allow easier handling of potential errors in the data bits, e.g. based on error distribution statistics. Error handling generally may comprise providing an error detection and/or correction signal (e.g., flag or bit or bit sequence). It may be considered that error handling pertains to, and/or is performed for, the plurality of data bits, or a combination of several pluralities of data bits, e.g. of different receiving events or of different pluralities of the same event.

There may be generally considered an electronic device comprising any one or any combination of integrated circuitry described herein. In particular, an electronic device may comprise integrated circuitry comprising a bit receiving arrangement and a bit inversion arrangement as described herein, as well as a bit transmitting arrangement, which may be operably connected to the bit receiving arrangement for transmitting the plurality of data bits and/or the data bit inversion bit to the bit receiving arrangement. The bit transmitting arrangement may be on the same PCB (Printed Circuit Board) and/or substrate and/or die and/or chip as the bit receiving arrangement, or may be separated therefrom, e.g. connected or connectable via a plurality of wires and/or lines and/or a connector arrangement. The number of wires may correspond to the number bits associated to the bit receiving arrangement and/or the bit transmitting arrangement.

A network node for a wireless communication network is also described. The network node may comprise ay one of the electronic devices described herein and/or any integrated circuitry as described herein. The network node may be a base station and/or radio node for the wireless communication network. The wireless communication network may be a 4G and/or 5G network, e.g. according to one or more 3GPP standards, e.g. LTE (Long Term Evolution) and/or LTE Evolution and/or NR (New Radio). The integrated circuitry described is particularly suitable for the demands of such wireless communication technology, as it allows efficient data bit transport with increased reliability, in particular within components of the network node. This is particular advantageous in light of the ever increasing data flows expected for such wireless communication networks.

A data transport unit may generally comprise and/or refer to and/or be implemented as a pin and/or line and/or individual circuitry or subcircuitry, e.g. for transmission and/or reception of a bit. Subcircuitry may generally comprise one or more elements of associated circuitry adapted for cooperation and/or in operable connection to other elements of the circuitry. Subcircuitry may be considered electronic circuitry. Data transport may generally comprise transmission and/or reception of bits, e.g. the plurality of data bits and the data bit inversion bit, e.g. in parallel (at least the data bits, in particular the plurality of data bits and the associated data bit inversion bit), in particular via an electrically conductive connection like wire/s and/or pins.

An element of circuitry may comprise and/or be implemented as any, or any combination of, electronic component/s. An electronic component may be a passive or active component. An electronic component may comprise and/or be implemented as, for example, transistor and/or diode (as examples for active components) and/or resistor and/or memristor and/or capacitor and/or magnetic (and/or inductive) component (as examples for passive components). An arrangement of integrated circuitry may be considered an example of subcircuitry.

An arrangement of integrated circuitry may generally comprise one or more electronic components, and/or one or more data transport units. It may be considered that an arrangement, in particular a bit receiving arrangement, comprises, and/or is connected or connectable to, one or more electrically conductive connections, e.g. wires and/or pins, e.g. for receiving the plurality of data bits and the associated data bit inversion bits, which may be transported via and/or on and/or utilising such electrically conductive connections. For each of the plurality of data bits and the data bit inversion bit (e.g., exactly) one (independent and/or dedicated) electrically conductive connection, e.g. one pin and/or wire for each bit, may be associated and/or connected or connectable to the bit receiving arrangement.

A determination of the inversion estimate bit may generally comprise constructing and/or determining (or reconstructing) a data bit inversion bit based on the plurality of data bits. The inversion estimate bit may in general represent a data bit inversion bit as a transmitter of the plurality of data bits would have constructed or determined it, if it transmitted the plurality of data bits as received (representing error free transmission of the plurality of data bits).

A receiving bit arrangement (as well as a transmitting bit arrangement) may comprise, and/or be implemented as part of, a data bus. The data bus may comprise the number of data transport units associated thereto and/or comprise and/or represent a number of bits, which may be transported (in particular, transmitted or received) by the bus in parallel and/or simultaneously. It may be considered that a data bus is a parallel bus. The receiving bit arrangement, respectively the associated bus, may be a memory bus, or a connector bus for connecting multiple (2 or more) devices or circuit (it may for example be a PCI, Peripheral Component Interconnect, bus). The receiving bit arrangement, respectively the data bus, may be a physical layer bus. The receiving bit arrangement and/or the integrated circuitry and/or the data bus may be adapted for DDR (Double Data Rate) reception, and/or the plurality of data bits and/or the data bit inversion bit may be received as DDR signaling. The receiving bit arrangement may be connected or connectable to, and/or comprise, a bit mapping arrangement, e.g. a gearbox, which may be adapted to map the plurality of data bits of more than one reception event to a data transmission arrangement like a data bus adapted for transmitting a larger number of bits than the number of bits of the plurality of data bits.

Generally, the data bit inversion bit may be a Data Bus Inversion, DBI, bit.

Each bit may generally be assigned a bit value, which may take one of two specific values, e.g. 0 and 1, or 1 and –1. Each of the specific values may be associated to and/or mapped to a specific electric state of the associated bit (or associated data transport unit), e.g. in terms of voltage and/or amplitude and/or charge level. Generally, all bits of the plurality of bits may be considered to have the same mapping (such that each bit in one state is to be interpreted the same). Inverting a data bit, or the plurality of data bits, may generally refer to assigning and/or mapping one of the two values to the electric state of the bit/s received. Inverting may comprise physically inverting the bit/s, e.g. from one of the states to the other. It may be considered that inverting may comprise determining and/or providing a signal (e.g., a flag and/or bit) indicating the mapping to be used. Inverting may comprise reversing and/or changing the mapping, e.g. between two reception events. It may generally be considered that inverting comprises inverting relative to an earlier (in particular, directly preceding) reception event. In some variant, inverting may comprise determining and/or inverting relative to a default and/or base level, which may e.g. generally define a mapping between electric state and bit value. A change in electric state (e.g., of bit and/or data transport unit) may generally be called a transition. Such may in particular occur between two subsequent reception (or transmission) events.

In the context of this specification, a data bit may represent any kind of information or data, to which a data bit inversion bit is associated. Such data or information may for example be user data and/or payload data and/or error handling data (e.g., ECC bit) and/or control data (e.g., related to addressing). Different data bits of the plurality of data bits may represent different kinds of information or data.

An electronic device, or integrated circuitry, may comprise, and/or be part of, ASIC (Application Specific Integrated Circuitry) and/or FPGA (Field Programmable Gate Array) and/or a processor and/or microcontroller and/or memory and/or connector. In particular, each of such devices may comprise integrated circuitry connected or connectable for data transport.

BRIEF DESCRIPTION OF THE DRAWINGS

The drawings are provided to illustrate and elucidate the approaches and concepts discussed herein and are not intended to limit their scope. The drawings comprise.

DETAILED DESCRIPTION

High speed parallel bus transmission or transport between two units or devices (e.g., between PCB:s, between Integrated Circuits (IC) on a PCB, between IC:s within a multichip module) may be subject to several methods to improve different characteristics.

For example, there may be implemented DDR techniques, which are used to send two data bits per clock cycle and reduce the number of physical connections between the units by two compared to single data rate techniques.

DBI, Data Bus Inversion, may be implemented as a method to reduce the number of data lines transitions between two consecutive transactions in order to save power.

High speed parallel bus transmission between units are often subject to noise, which introduce data corruption, e.g flip a data bit from 0→1 or 1→0. To ameliorate this problem, some extra data bits may be added, which implement an error correction code, which can correct a failing bit, per transaction/event basis.

In the following, specific examples of proposed approaches are discussed.

There may be assumed, for an example, a data bus comprising 64 bit (payload) data, 6 bit control, 8 bit ECC (all three types of bits representing data bits) and one DBI bit, which ends up in 79 bit interface in total. All bits may be protected by the ECC code.

For transmission via a 40 bit DDR interface (e.g., for transport to another device or unit), mapping of these bits has to be done to a plurality of data bits, e.g. using a gearbox or similar arrangement. Every transaction (transmission event) may contain a plurality of data bits comprising 32 bit (payload) data, 3 bit control and 4 bit ECC, as well as a data bit inversion bit in the form of 1 bit DBI (note that this DBI is related to the 40 bit DDR interface/bus, whereas the above-mentioned one is related to the 79 bit bus). In this case, the DBI bits cannot be covered by the ECC code, since the DBI must be supplied per transaction over the interface and the ECC is calculated over the complete data packet. ECC per transaction (transmission event) within the given conditions is not possible, since ECC does not scale linearly. ECC for 40 bit requires a least 6 bits, while only 4 bits are available in this example. The DBI bits represent each a data bit inversion bit.

The DBI bits is unprotected (by ECC) and the BER (Bit Error Rate) may be increased. If the DBI bit is altered due to noise, 50% of the bits in the original data (data bits) will be wrong and impossible to correct with ECC.

Figure 1:
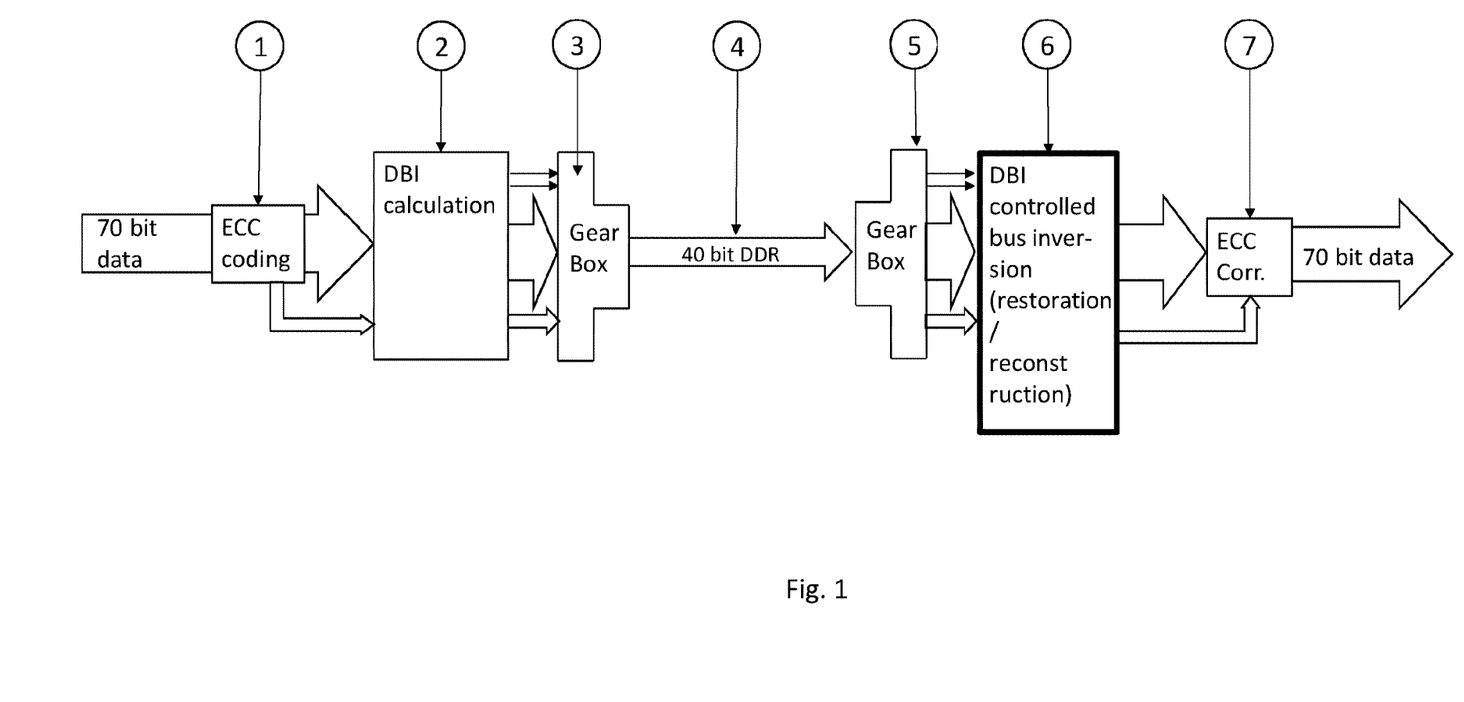
FIG. 1, schematically showing a setup for data transport using DDR.

A corresponding setup is shown in FIG. 1. Reference numerals 1 to 3 are on the side transmitting data using a DDR interface 4, reference numerals 5 to 7 represent the receiving side.

FIG. 1 shows an incoming of 70 bits of data to be transported (comprising 64 bit of payload data and 6 bit of control data). Reference numeral 1 indicates an error corrector 1 providing error correction bit coding, which adds 8 bit data, represented by the lower arrow. Data bus inversion calculation unit 2 is adapted for comparing current data with previous data, and to calculate if the plain or inverted data would cause least transitions on the data bus, as one example of utilising DBI. This may result in two DBI bits (indicated by the top two arrows), which may be associated to different pluralities of data bits formed of the 78 bits of data, wherein each plurality may comprise 39 bits (e.g. 32 payload data, 3 control data, 4 ECC).

A gearbox 3 is provided to convert the 80 bit data/per clock cycle to 2*40 bit data/clock cycle in this example. If the bus used for transport is broad enough to cover the full width of data bits and DBI bits, a gearbox may not be necessary.

The transmission interface 4 (represented by a 40 bit DDR bus) is subject to noise disturbance, which may introduce error/s.

On the receiving side, a gearbox 5 may convert 2*40 bit data/clock cycle to 80 bit data/clock cycle. This gearbox 5 may be part of a bit receiving arrangement, or be connected thereto.

A bit inversion arrangement represented by inverter block 6 inverts the data bits of each plurality of data bits based on the associated DBI bit, e.g. if the associated DBI bit is 1.

As an error handling arrangement, there is provided an error correction block 7, which in this example may repair 1 bit failure and detect two bit errors. The capability of an error handling arrangement for detecting and/or correcting error/s may depend on the error handling method used and/or the number of bits available for error handling.

By reconstructing/recalculating the DBI bit value/s in the receiving side (by determining an inversion estimate bit associated to each DBI bit), it is possible to determine, with high probability, if the DBI has been altered or not (transported with an error). DBI protection thus is provided even though the DBI bit/s are not included in the ECC. With a fairly simple functional addition, the reliability over the data link is significantly increased.

Accordingly, the data inversion block 6 may be replaced and/or expanded to a bit inversion arrangement as suggested herein, e.g. by applying or implementing an algorithm that improves the link reliability by determining the correct value of DBI.

This determination may be based on a comparison between the received DBI bit value/s (associated to the transport via data bus 4) and associated inversion estimate bits as described below. A corresponding comparison arrangement may be implemented as part of the bit inversion arrangement.

Figure 2:
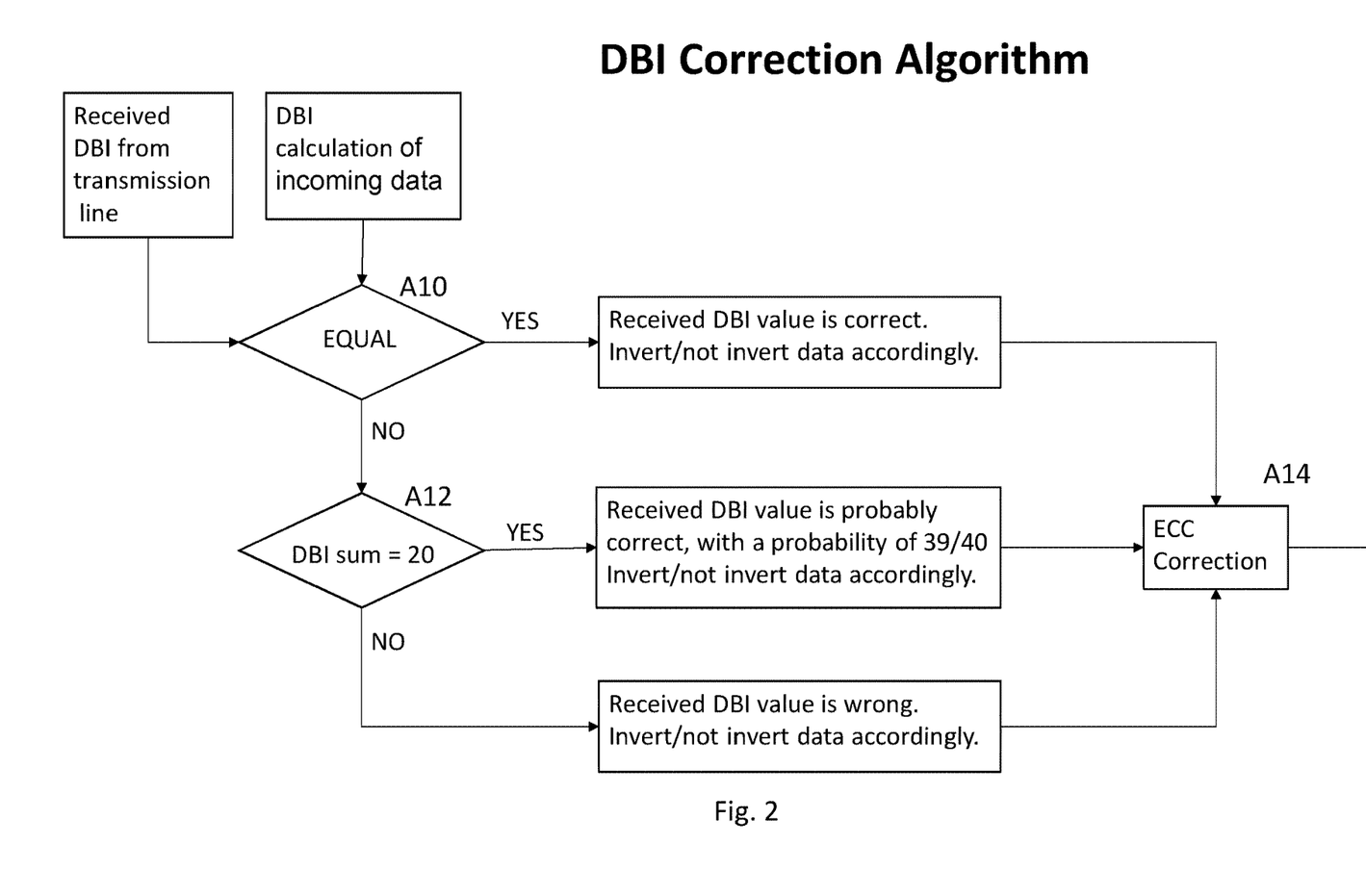
FIG. 2, showing an exemplary DBI correction algorithm as example method for operating integrated circuitry.

FIG. 2 shows a flow chart of an exemplary algorithm, which may be implemented in integrated circuitry and/or a bit inversion arrangement. In an action A10, a comparison (bitwise comparison) of a received DBI bit with a DBI determined by the bit inversion arrangement (which represents an inversion estimate bit) based on received plurality of data bits is performed. If the bits are equal, it is branched to action A14, assuming that the received DBI bit is correct.

Inverting may be performed according to the received DBI bit. It the bits are unequal, in an optional action A12, a midpoint check may be performed.

In this variant, it is determined if the number of transitions (DBI sum) needed from the previous reception event to the current reception event equals half the number of bits/data transport units (20 bits) of the data bus used for transport (e.g., data bus 4). If this is the case, it is branched to action A14, assuming with high likelihood, as explained below, that the DBI bit received is correct. If the DBI sum is different from the midpoint, it may be assumed that the DBI bit received has a wrong value (shows an error). Inverting may be performed accordingly, against the indication of the received DBI bit.

Figure 3:
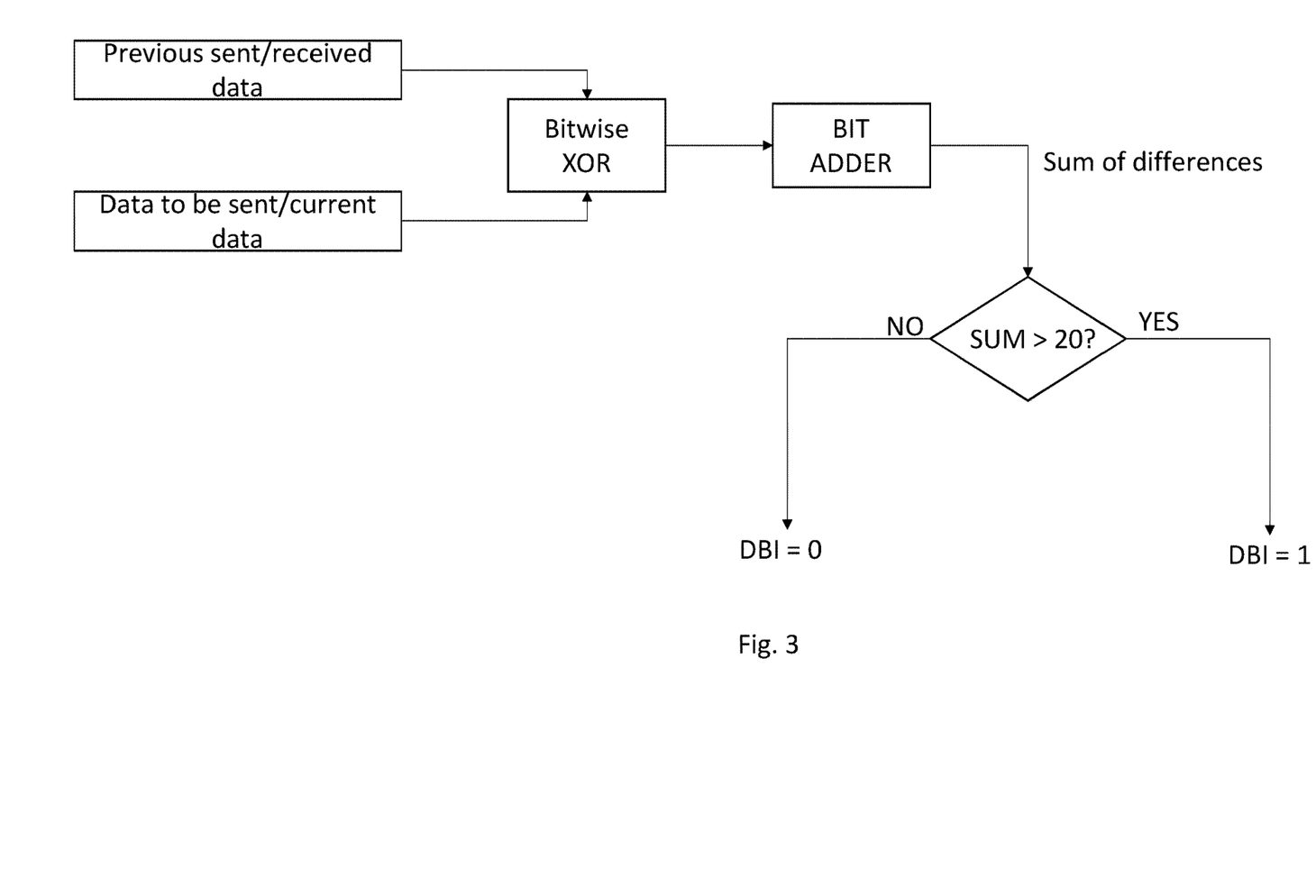
FIG. 3, showing an exemplary circuitry with flow of operations.

It should be noted that for this example, it is not essential exactly what the DBI bit represents, as long as a corresponding inversion estimate bit may be determined on the receiving side. FIG. 3 shows a specific example of determining the inversion estimate bit, which reflects or mirrors the determination of the DBI bit/data bit inversion bit on the transmitting side. The associated implementation may be part of a bit inversion arrangement and/or connected thereto for providing the inversion estimate bit.

The inversion estimate bit or DBI according to FIG. 3 is determined or created by calculating the number of data bit transitions for one transaction/transport event on the bus. This is achieved in this example by combining the bit of a plurality of data bits received at an earlier/the preceding receiving event with the current data in a bitwise XOR operation, which may be implemented in a corresponding comparison arrangement or XOR arrangement. For transmitting, data previously sent and data to be currently sent are treated analogously. A bit adder adds the results of the bitwise XOR to provide a transition sum. The bit adder may be part of the comparison arrangement and/or bit inversion arrangement, or connected thereto. If the transition sum indicates more transitions than non-transitions (in the example, transition sum SUM>20), the inversion estimate bit (or DBI bit for transmission, DBI in FIG. 3 refers to either) is set to indicate inversion, if not, the bit is not set.

This is one implementation of counting all switching signals (transitions of data bits), namely, those which differ from previous transaction/event, and then invert the data bus if this would require less transitions.

It may be assumed that a noise introduced error will be evenly distributed over the transmission lines (data transport units).

In 39 cases out of 40, it may be determined that it is the data that has been affected, not the DBI line. For the remaining case, the probability to that the error relates to the data is 39 of 40, and 1 of 40 for the DBI signal. The algorithm will take the proper decision 1599/1600, which corresponds to 99.9375%.

For a number of transported bits (number of data bits plus data bit inversion bit/s) of 40 as discussed in this example, the midpoint (half the number of bits) is 20. At the midpoint, the following may be considered.

If the number of differences (transitions) is, for example 18, a single error in the data bits will not affect the inversion estimate value. Depending of the error, a single error will give a transition sum value of 17 or 19, which in both cases will result in the inversion estimate bit DBI=0. However, if the determined transition sum value is the midpoint value (=20 in this example), it can either be:

That it should have been lower than the midpoint value, in this case 19, but one bit has changed so the calculation ends up to be the midpoint value of 20, In this case, the DBI is correct.

That it should have been 21, but one bit has changed so the calculation ends up in 20. In this case, the DBI is wrong.

| Diff pins | Switching pins(39 − diff + dbi) | DBI | |
|---|---|---|---|
| 22 | 18 | 1 | |
| 21 | 19 | 1 | |
| ~~20~~ | ~~20~~ | ~~1~~ | Redundant, not used |
| 20 | 20 | 0 | |
| 19 | 19 | 0 | |
| 18 | 18 | 0 | |
| 17 | 17 | 0 | |

This is represented in the above table. For this midpoint case it cannot be determined which DBI value is correct. In the first case, the DBI value is correct, in the second case it is wrong. It is suggested to assume that the DBI value is correct in this case, since the probability for this is 39/40. Still, if the second case occurs, this erroneous assumption will lead to an uncorrectable error in the error handling arrangement, e.g. ECC unit.

Figure 4:
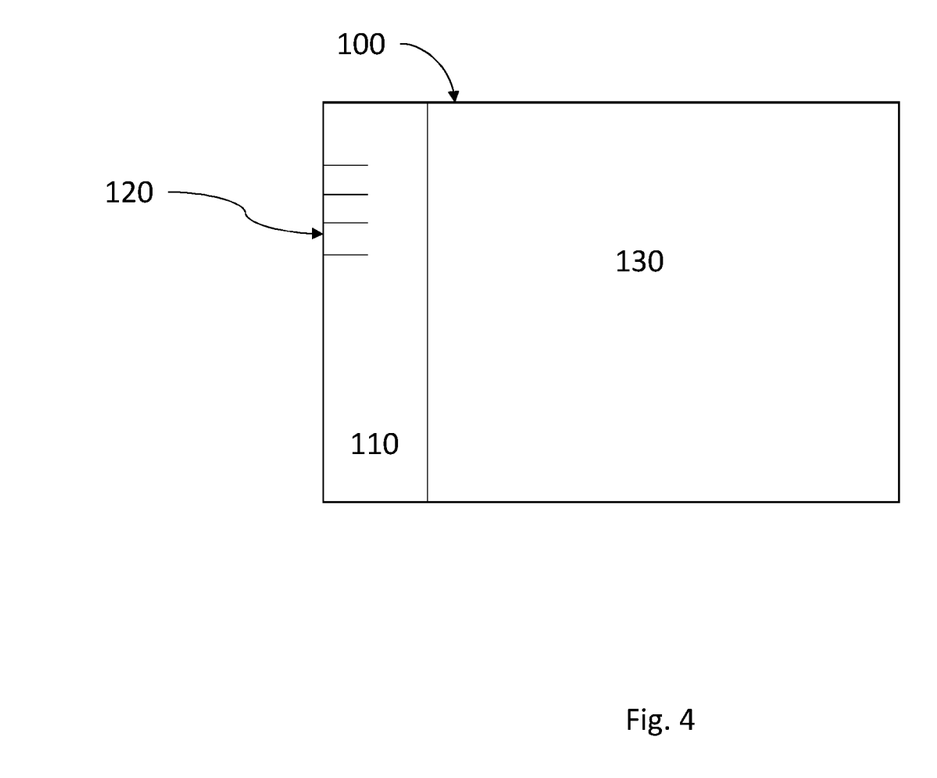
FIG. 4, schematically showing another exemplary integrated circuitry.

FIG. 4 schematically shows integrated circuitry 100. The integrated circuitry 100 comprises a bit receiving arrangement 110, which may comprise a plurality of data transport units 120, which may be for implementation of a data bus. The integrated circuitry 100 also comprises a bit inversion arrangement 130.

Figure 5:
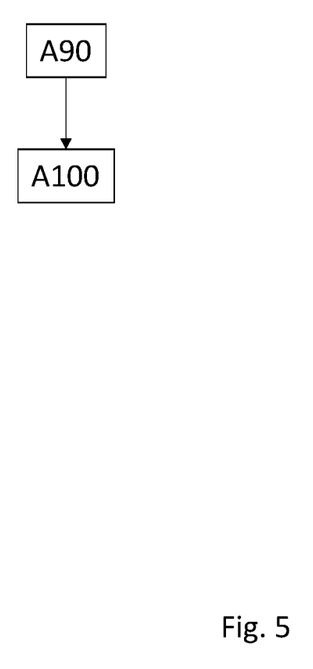
FIG. 5, schematically showing a flow diagram of another exemplary method for operating an integrated circuitry.

FIG. 5 shows an example of a method for operating integrated circuitry, which may be any integrated circuitry discussed herein, in particular integrated circuitry 100. The method comprises an action A100 of inverting the bits of a plurality of data bits received in parallel based on a comparison between a data bit inversion bit associated to the plurality of data bits and an inversion estimate bit, the inversion estimate bit being determined based on the plurality of data bits. The method may optionally comprise an action A90 of receiving the plurality of data bits and the bit data bit inversion bit, and/or of determining the inversion estimate bit.

Some useful abbreviations comprise:

| Abbreviation | Explanation |
|---|---|
| BER | Bit Error Rate |
| DBI | Data Bus Inversion |
| DDR | Double Data Rate |
| ECC | Error Correction Code |
| XOR | Exclusive OR, logical function |

The invention claimed is:

1. An integrated circuitry comprising:
a bit receiving arrangement configured to receive, in parallel, a plurality of data bits, the bit receiving arrangement further being configured to receive a data bit inversion bit associated to the plurality of data bits, the data bit inversion bit being for indicating whether the bits of the plurality of data bits are inverted; and
a bit inversion arrangement configured to invert the bits of the plurality of data bits based on a comparison between the received data bit inversion bit and an inversion estimate bit, the inversion estimate bit being determined based on the plurality of data bits;
the inversion estimate bit being determined based on a determination of the number of bit transitions necessary to arrive at the plurality of data bits from a previously received plurality of data bits; and
if a midpoint hit is indicated, the midpoint hit indicating that half of the bits of the plurality of data bits required bit transitions from a previously received plurality of data bits, the bit inversion arrangement inverts the bits of the plurality of data bits based on the received data inversion bit.

2. An electronic device comprising integrated circuitry, the integrated circuitry comprising:
a bit receiving arrangement configured to receive, in parallel, a plurality of data bits, the bit receiving arrangement further being configured to receive a data bit inversion bit associated to the plurality of data bits, the data bit inversion bit being for indicating whether the bits of the plurality of data bits are inverted; and
a bit inversion arrangement configured to invert the bits of the plurality of data bits based on a comparison between the received data bit inversion bit and an inversion estimate bit, the inversion estimate bit being determined based on the plurality of data bits;
the inversion estimate bit being determined based on a determination of the number of bit transitions necessary to arrive at the plurality of data bits from a previously received plurality of data bits; and
if a midpoint hit is indicated, the midpoint hit indicating that half of the bits of the plurality of data bits required bit transitions from a previously received plurality of data bits, the bit inversion arrangement inverts the bits of the plurality of data bits based on the received data inversion bit.

3. A network node for a wireless communication network, the network node comprising at least one of integrated circuitry and an electronic device having integrated circuitry, the integrated circuitry comprising:
a bit receiving arrangement configured to receive, in parallel, a plurality of data bits, the bit receiving arrangement further being configured to receive a data bit inversion bit associated to the plurality of data bits, the data bit inversion bit being for indicating whether the bits of the plurality of data bits are inverted; and
a bit inversion arrangement configured to invert the bits of the plurality of data bits based on a comparison between the received data bit inversion bit and an inversion estimate bit, the inversion estimate bit being determined based on the plurality of data bits;
the inversion estimate bit being determined based on a determination of the number of bit transitions necessary to arrive at the plurality of data bits from a previously received plurality of data bits; and
if a midpoint hit is indicated, the midpoint hit indicating that half of the bits of the plurality of data bits required bit transitions from a previously received plurality of data bits, the bit inversion arrangement inverts the bits of the plurality of data bits based on the received data inversion bit.

4. A method for operating integrated circuitry, the integrated circuitry having a bit receiving arrangement and a bit inversion arrangement, the bit receiving arrangement configured to receive, in parallel, a plurality of data bits, the bit receiving arrangement further being configured to receive a data bit inversion bit associated to the plurality of data bits, the data bit inversion bit being for indicating whether the bits of the plurality of data bits are inverted, the method comprising:

inverting, via the bit inversion arrangement, the bits of the plurality of data bits received in parallel based on a comparison between the data bit inversion bit associated to the plurality of data bits and an inversion estimate bit, the inversion estimate bit being determined based on the plurality of data bits;

the inversion estimate bit being determined based on a determination of the number of bit transitions necessary to arrive at the plurality of data bits from a previously received plurality of data bits; and     if a midpoint hit is indicated, the midpoint hit indicating that half of the bits of the plurality of data bits required bit transitions from a previously received plurality of data bits, the bits of the plurality of data bits are inverted based on the received data inversion bit.

\* \* \* \* \*